June 8, 1954

S. SENSIPER 2,680,837

APPARATUS FOR MEASURING IMPEDANCE
IN THE MICROWAVE REGION

Filed June 14, 1952

INVENTOR
SAMUEL SENSIPER
BY
Paul B. Hunter,
ATTORNEY

Patented June 8, 1954

2,680,837

UNITED STATES PATENT OFFICE 2,680,837

APPARATUS FOR MEASURING IMPEDANCE IN THE MICROWAVE REGION

Samuel Sensiper, Los Angeles, Calif., assignor to The Sperry Corporation, a corporation of Delaware Application June 14, 1952, Serial No. 293,698

16 Claims. (Cl. 324—58)

This invention relates to measuring apparatus useful in the microwave region of the frequency spectrum, and, more particularly, is concerned with means for rapidly and automatically measuring impedance of a microwave load as a function of frequency.

The method in general use for making impedance measurements in the microwave region is to utilize a slotted section of transmission line for investigating standing waves along the line by means of a probe movable along the slot. Information which can be obtained from the probe includes the position of the nodal points and the ratio of maximum to minimum voltage along the line. From this information it is possible to compute the normalized impedance at any point along the line looking toward the load. To obtain a plot of impedance as a function of input frequency, it is necessary that a point-by-point computation be made, so that such a system of investigating the impedance characteristics of the load as a function of frequency is slow and tedious.

Some attempts have been made to make automatic measurements of impedance by means of fixed probes spaced along the line, or by using a pair of directional couplers, one for measuring the ratio of the amplitudes of the incident and reflected waves and the other for investigating the phase relationship between the reflected and incident waves. Such known systems are generally frequency sensitive and therefore not readily adapted to continuous measurement of impedance as a function of frequency except over a limited frequency band. Other known rapid impedance measuring systems are not capable of functioning in the ultra-high-frequency region above 1000 megacycles.

It is the general object of this invention to avoid and overcome the foregoing and other difficulties of and objections to the prior art practices by the provision of apparatus for measuring impedance in the ultra-high-frequency region which is automatic, rapid, accurate, and operable continuously over a broad frequency band.

Another object of this invention is to provide impedance measuring apparatus which plots the phase angle and reflection coefficient of a microwave load on a Smith chart from which the impedance of the test load as a function of frequency can be directly determined.

Another object of this invention is the provision of means for automatically indicating the position of a standing wave minimum along a transmission line.

Another object of this invention is to provide apparatus for automatically and continuously indicating the wave-length of a varying ultra-high-frequency signal transmitted along a transmission line.

These and other objects of the invention which will become apparent as the description proceeds are achieved by the provision of apparatus including a variable frequency source of microwave energy having suitable mechanical drive means for varying the microwave energy source over its entire frequency range at a substantially linear rate. The output of the microwave energy source is coupled to the test load through a length of wave guide transmission line, a portion of which is slotted. Novel servo operated probe means adapted to travel in the slotted portion of the transmission line automatically locks on and follows a standing wave minimum along the transmission line as the frequency is varied. A slide wire potentiometer is mechanically coupled to the servo operated probe means for providing a voltage proportional to the relative position of the probe means along the transmission line.

A voltage proportional to the instantaneous wavelength of the varying frequency source is fed, together with the output of the slide wire potentiometer, to a computer which includes a servomotor, the angular position of the servomotor shaft being controlled in proportion to the ratio of the slide wire voltage to the wavelength voltage. Thus, the angular position of the servomotor shaft is made proportional to the distance of a standing wave minimum from the test load divided by the instantaneous wavelength. The servomotor rotates a Smith chart, the angular position of the Smith chart being a direct measure of the phase angle of the reflection coefficient of the load.

A recording pen is provided which can be moved radially across the Smith chart and is controlled by suitable control means including a directional coupler in the transmission line which samples the reflected energy from the test load. The pen is positioned by said control means at a radial distance from the center of the Smith chart proportional to the magnitude of the reflection coefficient. The Smith chart provides a direct reading in terms of normalized impedance of the measured load from the reflection coefficient as plotted in polar coordinates by the recording pen.

For a better understanding of the invention reference should be had to the accompanying drawing, wherein.

Figure 1:
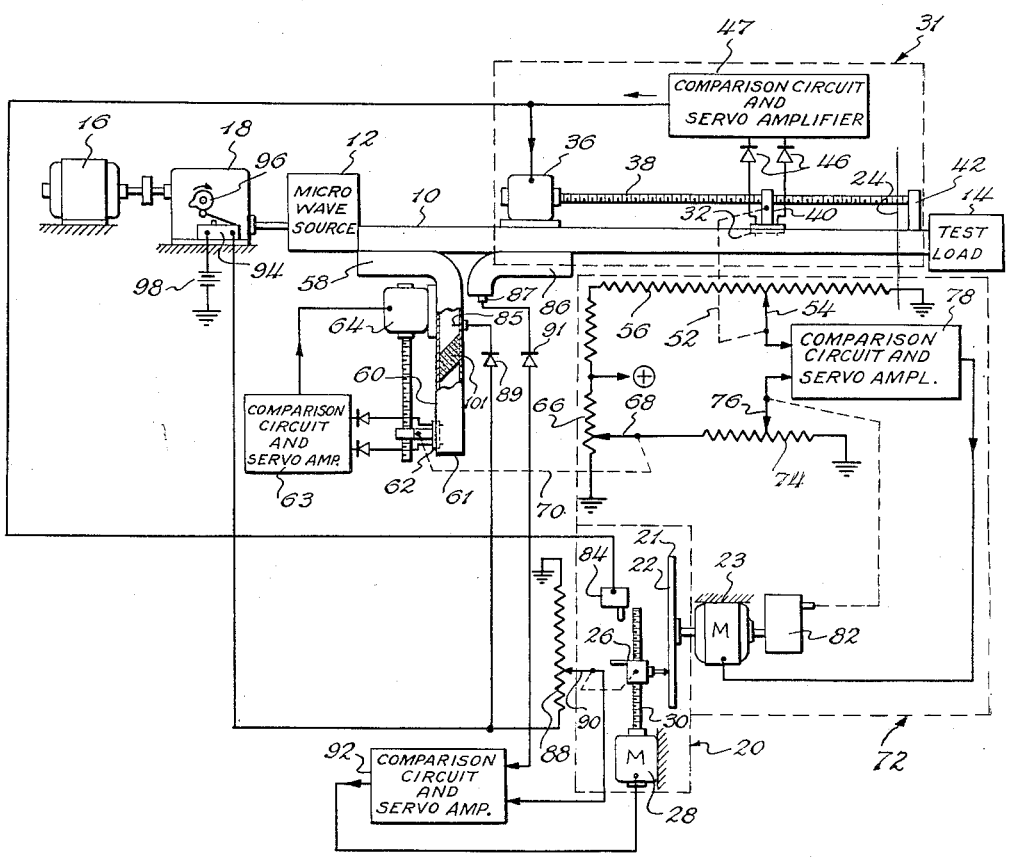
Fig. 1 is a diagrammatic showing of the impedance measuring system.

Referring now to the invention as shown in Fig. 1, the numeral 10 indicates generally a transmission line which transmits microwave energy from a variable frequency klystron source 12 to a test load 14. The transmission line is preferably a hollow wave guide or coaxial line capable of efficiently transmitting microwave energy. The microwave energy source 12 is mechanically tuned through a frequency band, for example of the order of 4000 to 6000 megacycles, by any suitable drive means, such as a motor 16 and gear drive 18. The mechanical drive system is preferably designed to provide a substantially linear change in frequency throughout the frequency range of the microwave source.

The test load 14 which terminates the transmission line, unless it matches the characteristic impedance of the line, reflects a portion of the incident energy back toward the generator, producing standing waves along the line. It can be shown that the impedance looking toward the load at any point along the transmission line is then completely defined by the amplitude and phase relationship of the reflected and incident waves at that point, this relationship being commonly referred to as the reflection coefficient.

A convenient means for graphically converting the reflection coefficient into impedance, developed by P. H. Smith and described in Electronics, vol. 12, January 1939, pages 29–31, is in the form of a chart, commonly referred to as a Smith chart, on which the resistive and reactive impedance components are represented by two orthogonal families of circular curves superimposed on a polar coordinate representation of reflection coefficient. Thus, if the magnitude and phase of the reflection coefficient at any point along a transmission line are plotted as the radial and angular coordinates, respectively, on the Smith chart, the corresponding resistive and reactive components of the normalized impedance of the transmission line at the point under consideration can be read off directly from the orthogonal families of curves.

In the present invention to obtain a direct impedance measurement of a test load, information as to the magnitude and phase of the reflection coefficient at a particular point along the line 10 resulting from the test load 14 is used to control a Smith chart recorder, the recorder being indicated generally at 20. The recorder 20 includes a turntable 21 on which is mounted a Smith chart 22. The turntable is rotated by a servomotor 23, the angular position of the motor and turntable being controlled by means hereinafter described to conform with the phase angle of the reflection coefficient at any particular reference point, as indicated at 24, along the transmission line 10. A recording pen carriage 26 is positioned radially by a servomotor 28 through suitable means such as a screw-threaded shaft 30 which threadedly engages the carriage 26. The radial positioning of the pen carriage 26 by the motor 28 is controlled by means also hereinafter described to conform with the magnitude of the reflection coefficient at the reference point 24 along the transmission line.

The phase angle of the reflection coefficient at any point along the transmission line is the angle by which the reflected wave lags the incident wave at that point. Where the reflected wave and incident wave are exactly in phase, a voltage maximum in the standing wave occurs. At that point in the line the impedance is resistive and greater than the characteristic impedance of the line, and the phase angle is zero. At the point in the line where the reflected and incident waves are of exactly opposite phase, a voltage minimum occurs. The impedance at the minimum point is also resistive, but less than the characteristic impedance, and the phase angle is ±180°. The relative phase angle between the incident and reflected wave components varies along the line linearly with distance, changing 360° for every half wave-length along the line.

This cyclical variation along a uniform transmission line makes it possible to relate the phase angle at any point along the line to the phase angle at any other point along the line. The change in phase angle $\theta$ in traveling a distance $x$ along the transmission line may be expressed as $$\theta = 720° \frac{x}{\lambda_g} \qquad (1)$$

where $\lambda_g$ is the wavelength in the wave guide. Since the phase angle is a known value, as at a voltage minimum, the phase angle of the reflection coefficient at the reference point 24 can be computed from the above equation by obtaining the value of the distance $x$ from the voltage minimum to the reference point, and guide wavelength $\lambda_g$.

In the present invention this computation is done automatically, the results being translated into an angular position of the turntable 21.

Figure 2:
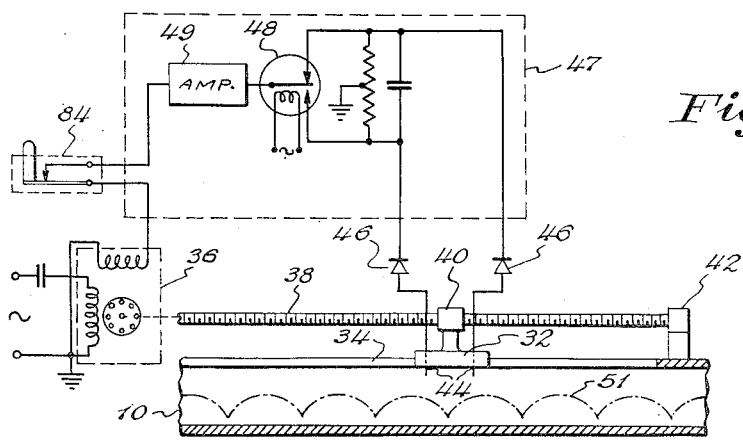
Fig. 2 is a schematic showing of the servo operated probe system.

To obtain information on the phase angle of the reflection coefficient to control the servomotor 23, a servo-operated probe system, indicated generally at 31, is provided. Details of the servo probe system are shown in Fig. 2. A probe carriage 32 is mounted for longitudinal movement and travels along a longitudinal slot 34 extending along a portion of the wave guide 10. Movement of the probe carriage 32 is effected by means of a servomotor 36, as, for example, by the rotation of a screw-threaded shaft 38 threadedly engaging a nut member 40 secured to the carriage 32. The end of the screw-threaded shaft 38 is preferably supported by a bearing block 42. Both the servomotor 36 and the bearing block 42 are secured to the wave guide 10 or otherwise anchored in fixed relationship to the transmission line.

Supported in spaced relationship by the carriage 32 are a pair of probes 44 which extend into the interior of the wave guide 10. For best operation of the servo probe system, the spacing between the probes should be of the order of a quarter wavelength as measured at the midband frequency of the operating frequency range. Each of the probes is connected through a suitable detector 46, such as a barretter or crystal, to a comparison circuit and servo amplifier, indicated generally at 47.

While numerous servomotor control circuits have been developed which might be used in the present invention, one suitable circuit is shown in which a vibrator 48 operating at the A. C. supply frequency alternately samples the two detected signals from the detectors 46. The signal developed by the vibrator is substantially a square wave signal having an amplitude and phase determined by the relative amplitude and polarity of the detected signals. The output of the vibrator 48 is amplified by an amplifier 49 and applied across one phase winding of the two phase servomotor 36, the direction of rotation and speed of the servomotor being thereby controlled by changes in the relative potential of the two detected signals. It should be noted that the output of the amplifier 49 applied across one winding of the two-phase motor 36 is in phase quadrature, either leading or lagging, with respect to the constant input signal across the other motor winding.

The detected potential at each of the probes 44 depends upon the electric field in the vicinity of the respective probes. Assuming a standing wave exists along the transmission line 10 (the variation of voltage in the standing wave along the wave guide 10 being indicated by the plot 51), it will be appreciated that the potential on either probe varies between the maximum and minimum voltage of the standing wave as the carriage is moved along the line. However, because the probes are spaced substantially a quarter wavelength apart, as the potential on one probe increases the potential on the other probe decreases. When the carriage is positioned, as in Fig. 2, symmetrically over a voltage minimum along the line, each of the probes is at the same potential. As the carriage is moved either side of this position, the potential on one of the probes increases while that on the other probe decreases. A shift in either direction from balance at a minimum produces an output error signal from the vibrator 48 having a relative phase which, when applied through the amplifier 49 to the servomotor 36, causes the servomotor 36 to rotate in a direction to reposition the carriage symmetrically with respect to the voltage minimum and again reduce the error signal to zero.

While the servo-operated probe system has been described as centering on a voltage minimum, it will be understood that such a servo probe system may be made to center on a voltage maximum by reversing the direction of rotation of the servomotor 36 with a given output signal from the vibrator 17. Although a zero difference signal between the probes occurs when the carriage 32 is positioned symmetrically with respect to either a voltage maximum or minimum, at only one of these points will the servo-operated probe system be in a stable balanced condition.

Coupled mechanically to the carriage 32, as indicated by the dash line 52 in Fig. 1, is the moving contact 54 of a slide wire potentiometer 56. The potential of the slide wire potentiometer is zero opposite the reference point 24. Thus, movement of the sliding contact 54 provides a voltage at the sliding contact proportional to the position of a voltage minimum of the standing wave, as produced by the test load 14, relative to the reference point 24, that is, the distance $x$ in Equation 1.

To obtain a voltage proportional to the wavelength of the microwave signal in the guide 10 as the klystron 12 sweeps through the frequency range, a directional coupler 58 is provided which couples energy from the incident wave along the transmission line 10 into a slotted wave guide section 60 terminated at its end in a short circuit 61. A double probe servo-operated system, similar to the above described servo-operated probe system 31, operates along the slotted wave guide section 60 and includes a probe carriage 62 which is longitudinally positioned along the slotted wave guide section by a servo motor 64 operated by a comparison circuit and servo amplifier 63. The probe carriage 62 automatically positions itself at a voltage minimum of the standing wave established in the wave guide 60 by the short circuit termination 61. Since a voltage minimum occurs at the short circuit, the distance of the probe carriage 62 from the short circuit is proportional to the wavelength of the energy in the guide 60. By making the guide 60 of the same cross-sectional dimensions as the main waveguide 10, an automatic indication of the guide wavelength of the energy along the waveguide 10 is obtained.

A potentiometer 66 has its slide wire contact 68 mechanically coupled to the probe carriage 62, as indicated by the dash line 70. By applying a fixed voltage across the potentiometer 66 such that the potential on the potentiometer adjacent the position of the short circuit termination of the wave guide 60 is zero, the potential of the sliding contact 68 is made proportional to the position of the travelling probe carriage 62, and thereby is made proportional to the wavelength of the energy in the guide.

Thus, a voltage proportional to the distance $x$ is derived from the sliding contact 54 of the potentiometer 56, and a voltage proportional to the guide wavelength $\lambda_g$ is derived from the sliding contact 68 of the potentiometer 66. These potentiometers are part of a computer, indicated generally at 72, which controls the angular position of the servo motor 23, and associated turntable 21 and Smith chart 22, in proportion to the ratio of the respective voltages at their sliding contacts in accordance with the relation expressed in Equation 1.

The computer 72 in addition includes a potentiometer 74. The voltage across the potentiometer 74, being derived from the voltage at the slide wire 68, is maintained proportional to the guide wavelength. The resistance of the potentiometer 74 is made quite large compared to the resistance of the potentiometer 66 to avoid appreciable loading error. The potential at the sliding contact 76 of the potentiometer 74 is compared with the potential at the sliding contact 54 in a comparison circuit and servo amplifier 78, identical to the comparison circuit and amplifier 47. Any difference in the potential between the respective sliding contacts 76 and 54 produces an output signal from the circuit 78 which is applied to the servomotor 23. For reasons which will hereinafter become apparent, a gear reducer 82 is provided in coupling the servomotor 23 to the sliding contact 76 of the potentiometer 74.

The signal derived from the circuit 78 causes the servomotor 23 to rotate in such a direction as to reposition the sliding contact 76 and equalize the voltage potential between the sliding contacts 76 and 54. Thus, as the potential at the sliding contact 54 changes, or the potential at the sliding contact 68 changes, an error signal is developed which operates the servomotor 23 in a manner to change the potential at the sliding contact 76 accordingly and again reduce the error signal to zero.

When the error signal derived from the output of the circuit 78 is reduced to zero, assuming the potentiometer 74 is linear, the position of the sliding contact 76 is proportional to the ratio of the potential at the sliding contact 54 to the potential of the sliding contact 68, and is therefore proportional to the ratio of the distance $x$ (which is the distance of the center of the probe carriage 32 from the reference point 24) to the guide wavelength $\lambda_g$.

Since the region at which reflection occurs varies with different test loads, the degree of shift in the position of a particular voltage minimum along the slotted portion of the transmission line with change in frequency over the complete range likewise varies, the distance which a voltage minimum moves with change in frequency being dependent in large part on the distance of the voltage minimum from the region of reflection in terms of wavelengths. Thus, if the wavelength is doubled, the distance to a particular voltage minimum is doubled, which means that if the particular voltage minimum is initially positioned at a distance from the region of reflection of a substantial number of wavelengths, considerable movement of the voltage minimum is effected by increasing the wavelength.

For this reason, the phase measuring apparatus is initially positioned to lock on to a voltage minimum as near as possible to the reference point 24, and the sweep is started at the high frequency end of the band. As the frequency is reduced, the wavelength in the guide increases and the servo probe system, in following a voltage minimum with changing frequency, moves along the slotted line away from the load. To insure that the probe carriage 32 has sufficient room to move in following a particular voltage minimum, it is desirable that the region of reflection established by the test load 14 be as near as possible to the reference point 24.

Depending in part on the distance from the reference point 24 to the test load 14, the change in phase of the reflection coefficient at the reference point 24 over the frequency band varies cyclically through the equivalent of several revolutions of the Smith chart. The slot 34 is made sufficiently long so that the probe carriage 32 can move a distance of the order of five wavelengths at the highest frequency. It is for this reason that an approximately 10 to 1 gear reduction is provided by the gear reducer 82 coupling the servomotor 23 to the sliding contact 76 of the potentiometer 74, the ratio being more or less determined by the length of the slot 34 in terms of half-wavelengths at the highest operating frequency. In moving through the entire length of the slot 34, the probe carriage 32, by moving the sliding contact 54 over the full voltage range of the potentiometer 56, may thus effect a number of revolutions of the Smith chart 22.

One difficulty encountered with a phase measuring system of the type described is that when a matched condition is approached between the test load 14 and transmission line 10, the resolution of the servo probe system drops off, and at match, the servo probe system ceases to function. For this reason, that is, to avoid instability, a limit switch 84 is provided which is actuated by movement of the pen carriage 26. As a match condition is approached, the pen carriage moves towards the center of the Smith chart. In the present system the limit switch 84 is actuated by the pen carriage to stop the servomotor 36 when the magnitude of the reflection coefficient drops below .05, or some other small predetermined value; measurement is resumed when the magnitude of the reflection coefficient again exceeds this figure. That the servo-operated probe system 31, when reactivated, may lock on to a different voltage minimum does not affect the final measurement since movement of the probe carriage 32 from one voltage minimum to the next produces a complete revolution of the Smith chart and the resulting impedance measurement is still the same.

It should be noted that the voltage across the potentiometer 74 at the shortest wavelength should be equal to or greater than the fixed voltage across the potentiometer 56. This insures that at all wavelengths, regardless of the position of the probe carriage 32 along the slot 34, the error voltage from the comparison circuit 78 can be reduced to zero by rotation of the servomotor 23.

The magnitude of the reflection coefficient is substantially constant along the length of the wave guide transmission line 10, so that measurement of the magnitude at any point along the line is the same as the magnitude of the reflection coefficient at the reference point 24.

The magnitude of reflected energy thus can be readily obtained by measuring the ratio of energy in the incident and reflected waves along the line. A directional coupler 86 is connected in series with the transmission line 10 by means of which the reflected energy along the line is sampled. Probe means, indicated at 85 and 87 in the directional couplers 58 and 86, together with detectors 89 and 91, produce output signals proportional respectively to the incident and reflected energy. An attenuator 101 is inserted in the waveguide section 60 to isolate the probe 85 from reflected energy from the shorted termination 61.

The detected voltage proportional to the incident energy is applied across a linear potentiometer 88, the sliding contact 90 of which is mechanically coupled to the pen carriage 26. The potential of the sliding contact 90 is compared with the detected voltage proportional to the reflected energy in the comparison circuit and servo amplifier 92, which is similar to the above described circuit 47. The servomotor 28 is actuated in response to any difference between the inputs of circuit 92 to move the sliding contact 90 and eliminate this difference, and at the same time reposition the pen carriage. Thus regardless of power variations in the incident wave, the sliding contact 90 is positioned to correspond to the relative amplitude of the reflected wave. The full range of the potentiometer 88 is made to correspond to the unity radius of the reflection coefficient circle on the Smith chart.

As the variation in amplitude and phase of the reflection coefficient at the reference point 24 is continuously recorded on the Smith chart 22, it is desirable that some frequency reference be recorded on the Smith chart so that the impedance measurements can be interpreted in terms of the instantaneous frequency of the energy transmitted to the load 14 under test. One way of accomplishing this quite simply is to provide a bias switch 94 which is mechanically actuated by the frequency tuning means of the klystron source 12. The bias switch 94 may be actuated by a cam 96 driven from the gear reducer 18. The switch is normally open but when momentarily actuated, connects the potentiometer 88 to a fixed voltage source 98. The bias switch thereby introduces a momentary deflection voltage on the servomotor 28 at periodic frequency intervals, such as every 50 or 100 megacycle change in frequency, as the motor 16 changes the output frequency of the source 12 through the range. Thus the frequency is recorded as a series of pips on the continuous plot recorded on the Smith chart.

From the above description it will be recognized that the objects of the invention have been achieved by the provision of apparatus which continuously records the normalized impedance of a test load, as measured at a reference point in the transmission line between the test load and a source of microwave energy, with changes in frequency of the incident energy. The impedance is recorded on a Smith chart by controlling the polar coordinates of the recording pen in proportion to the magnitude and phase of the reflection coefficient of the load. The apparatus described includes a novel servo probe system which automatically locks on to a standing wave voltage minimum. The servo probe system can be used to measure the instantaneous wavelength or, by means of suitable computer means, the phase angle of the reflection coefficient at any given point along a transmission line.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for automatically recording changes in impedance of a microwave load with changes in frequency, said apparatus comprising a variable frequency source of microwave energy, means for varying the frequency of the source over the operating frequency range at a substantially linear rate, a hollow wave guide coupling the source to the load, a portion of the wave guide having a longitudinal slot therein, a polar coordinate type recorder for plotting the magnitude and phase angle of the reflection coefficient of the load on an impedance chart, first servomotor means associated with the recorder for controlling the radial coordinate of the recorder, means responsive to the magnitude of the reflected energy in the wave guide from the load for operating said first servomotor means, probe means adapted to travel along the slot in the wave guide, second servomotor means for positioning the probe means, means electrically coupled to the probe means and responsive to the electric field potential along the wave guide detected by the probe means for controlling said second servomotor means, a position-indicating potentiometer mechanically coupled to the probe means for producing a voltage proportional to the position of the probe means relative to the load, wavelength responsive means for producing a voltage proportional to the wavelength in the wave guide, third servomotor means associated with the recorder for controlling the angular coordinate of the recorder, a potentiometer mechanically actuated by said third servomotor means, said voltage proportional to the wavelength being applied across said last mentioned potentiometer, means for controlling said third servomotor means in response to the difference in output voltage of said last mentioned potentiometer and the position-indicating potentiometer, said third servomotor means controlling the angular coordinate of the recorder in proportion to the ratio of the output voltage of the position-indicating potentiometer to the voltage proportional to the wavelength, and means actuated by said frequency varying means and associated with the recorder for indicating the frequency on the impedance chart.

2. Apparatus for automatically recording the impedance of a microwave load, said apparatus comprising a source of microwave energy, a hollow wave guide coupling the source to the load, a portion of the wave guide having a longitudinal slot therein, a polar coordinate type recorder for plotting the magnitude and phase angle of the reflection coefficient of the load on an impedance chart, first servomotor means associated with the recorder for controlling the radial coordinate of the recorder, means responsive to the magnitude of the reflected energy in the wave guide from the load for operating said first servomotor means, probe means adapted to travel along the slot in the wave guide, second servomotor means for positioning the probe means, means electrically coupled to the probe means and responsive to the electric field potential along the wave guide detected by the probe means for controlling said second servomotor means, a position-indicating potentiometer mechanically coupled to the probe means for producing a voltage proportional to the position of the probe means relative to the load, wavelength responsive means for producing a voltage proportional to the wavelength in the wave guide, third servomotor means mechanically coupled to the recorder for controlling the angular coordinate of the recorder, a potentiometer mechanically actuated by said third servomotor means, said voltage proportional to the wavelength being applied across said last mentioned potentiometer, and means for controlling said third servomotor means in response to the difference in output voltage of said last mentioned potentiometer and the position-indicating potentiometer, said third servomotor means controlling the angular coordinate of the recorder in proportion to the ratio of the ouput voltage of the position-indicating potentiometer to the voltage proportional to he wavelengh.

3. Apparatus for automatically recording the impedance of a microwave load, said apparatus comprising a source of microwave energy, a microwave transmission line coupling the source to the load, a polar coordinate type recorder for plotting the magnitude and phase angle of the reflection coefficient of the load on an impedance chart, first servomotor means associated with the recorder for controlling the radial coordinate of the recorder, means responsive to the magnitude of the reflected energy in the wave guide from the load for operating said first servomotor means, probe means adapted to travel along the line, second servomotor means for positioning the probe means, means electrically coupled to the probe means and responsive to the electric field potential along the line detected by the probe means for controlling said second servomotor means, a position-indicating potentiometer mechanically coupled to the probe means for producing a voltage proportional to the position of the probe means relative to the load, wavelength responsive means for producing a voltage proportional to the wavelength along the line, third servomotor means associated with the recorder for controlling the angular coordinate of the recorder, a potentiometer mechanically actuated by said second servomotor means, said voltage proportional to the wavelength being applied across said last mentioned potentiometer, and means for controlling said third servomotor means in response to the difference in output voltage of said last mentioned potentiometer and the position-indicating potentiometer, said third servomotor means controlling the angular coordinate of the recorder in proportion to the ratio of the output voltage of the position-indicating potentiometer to the voltage proportional to the wavelength.

4. Apparatus for automatically measuring the impedance of a microwave load, said apparatus comprising a source of microwave energy, a microwave transmission line coupling the source to the load, the load establishing a standing wave pattern along the line, means coupled to the line and responsive to the reflected energy from the load, said means producing an output signal proportional to the magnitude of the reflected energy from the load, probe means adapted to travel along the line, servomotor means for positioning the probe means, means electrically coupled to the probe means and responsive to the electric field potential along the line detected by said probe means for controlling the servomotor means, a position-indicating potentiometer mechanically coupled to the probe means for producing a voltage proportional to the position of the probe means relative to the load, wavelength responsive means for producing a voltage proportional to the wavelength along the line, means for determining the ratio of the output voltage of the position-indicating potentiometer to the voltage output of the wavelength responsive means, and impedance indicating means responsive simultaneously to the output of said ratio determining means and the reflected energy responsive means, said impedance indicating means presenting the impedance of the load as a point on an impedance chart, the polar coordinates of the point being proportional respectively to the output of the reflected energy responsive means and said ratio determining means.

5. In impedance measuring apparatus, means for automatically determining the phase angle of the reflection coefficient at a predetermined point along a transmission line on which are voltage standing waves, said means comprising a probe carriage associated with the transmission line and movable therealong, a sermomotor, drive means mechanically linking the servomotor to the probe carriage for effecting movement of the carriage along the line, a pair of probes secured to the probe carriage, detector means connected to each of the probes, comparison means coupled to the output of said detector means and responsive to the difference in detected potential at the two probes for controlling rotation of the servomotor, potentiomotor means having a sliding contact linked to the probe carriage for movement therewith, the potential at the sliidng contact being proportional to the distance of the probe carriage from said predetermined point along the transmission line, means for measuring the instantaneous wavelength along the transmission line, said means being adapted to produce a voltage proportional to the wavelength, a computer potentiometer having a sliding contact, a computer servomotor mechanically linked to said sliding contact, the voltage from said wavelength measuring means being applied across the computer potentiometer, second comparison means, the output at the sliding contact of the computer potentiometer and said potentiometer means being coupled to said second comparison means for controlling the rotation of said computer servomotor in response to the output of said second comparison means, the angular position of the servomotor shaft being thereby controlled in proportion to the phase angle of the reflection coefficient at said predetermined point.

6. In impedance measuring apparatus, means for automatically determining the phase angle of the reflection coefficient at a predetermined point along a transmission line on which are voltage standing waves, said means comprising a probe carriage associated with the transmission line and movable therealong, a servomotor, drive means mechanically linking the servomotor to the probe carriage for effecting movement of the carriage along the line, a pair of probes secured to the probe carriage, detector means connected to each of the probes, comparison means coupled to the output of said detector means and responsive to the difference in detected potential at the two probes for controlling rotation of the servomotor, potentiometer means having a sliding contact linked to the probe carriage for movement therewith, the potential at the sliding contact being proportional to the distance of the probe carriage from said predetermined point along the transmission line, means for measuring the instantaneous wavelength along the transmission line, said means being adapted to produce a voltage proportional to the wavelength, and means including a servomotor having an output shaft, said last named means being electrically connected to the sliding contact of said potentiometer means and to said wavelength measuring means for controlling the angular position of the servomotor shaft in proportion to the ratio of the output potential of said potentiometer means to the output potential of said wavelength measuring means.

7. In impedance measuring apparatus, means for automatically determining the phase angle of the reflection coefficient at a predetermined pont along a transmission line on which are voltage standing waves, said means comprising probe means associated with the line for movement therealong, servomotor means associated with said probe means for imparting movement to said probe means along the line, servo control means responsive to variations in potential along the line detected by said probe means, the servo control means actuating the servomotor to maintain the probe means at a position of minimum potential along the line, potentiometer means having a sliding contact linked to the probe means for movement therewith, the potential at the sliding contact being proportional to the distance of the probe means from said predetermined point along the transmission line, means for measuring the instantaneous wavelength along the transmission line, said means being adapted to produce a voltage proportional to the wavelength, and means including a servomotor having an output shaft, said last-named means being electrically connected to the sliding contact of said potentiometer means and to said wavelength measuring means for controlling the angular position of said servomotor shaft in proportion to the ratio of the output potential of said potentiometer means to the output potential of said wavelength measuring means.

8. In impedance measuring apparatus, means for automatically determining the phase angle of the reflection coefficient at a predetermined point along a transmission line on which are voltage standing waves, said means comprising servo operated probe means associated with the line for movement therealong, said servo operated probe means being automatically positioned along the line in fixed relation to the standing waves as detected by said probe means, potentiometer means having a sliding contact linked to the probe means for movement therewith, the potential at the sliding contact being proportional to the distance of the probe means from said predetermined point along the transmission line, means for indicating the instantaneous wavelength along the transmission line, said last named means being adapted to produce a voltage proportional to the wavelength, and computer means including a servomotor having an output shaft, said computer means being electrically connected to the sliding contact of said potentiometer means positioned by movement of the probe means and to said wavelength measuring means, said computer means controlling the angular position of said servomotor shaft in proportion to the ratio of the output potential of said potentiometer means to the output potential of said wavelength measuring means.

9. In impedance measuring apparatus, means for automatically determining the phase angle of the reflection coefficient at a predetermined point along a transmission line on which are voltage standing waves, said means comprising servo operated probe means associated with the line for movement therealong, said servo operated probe means being automatically positioned along the line in fixed relation to the standing wave pattern as detected by said probe means, means for indicating the instantaneous wave length along the transmission line, and computer means coupled respectively to said servo operated probe means and said wavelength indicating means for producing an output indication proportional to the ratio of the distance of said probe means from said predetermined point to the wavelength.

10. Apparatus for automatically indicating the position of a voltage maximum or minimum of a voltage standing wave pattern along a wave guide transmission line, said apparatus comprising a probe carriage associated with the transmission line and movable therealong, a pair of electric probes secured to the probe carriage, the wave guide transmission line having a longitudinal slot through which said probes extend, the probes being spaced apart along the slot a distance of the order of a quarter wavelength at the mean operating frequency, a servomotor, drive means mechanically linking the servomotor to the probe carriage whereby rotation of the servomotor moves the probe carriage along the slotted wave guide transmission line, a detector connected to each of the probes, a comparison circuit connected to each of the detectors, the alternating current output signal of said comparison circuit having a voltage amplitude proportional to the difference in the detected potentials at the probes, the phase of said output signal being determined by the relative potential of the two probes, and amplifier means coupled to said comparison circuit for controlling the servomotor in response to said output signal, the direction of rotation of the servomotor being determined by the phase of said output signal.

11. Apparatus for automatically indicating the position of a voltage maximum or minimum of a voltage standing wave pattern along a wave guide transmission line, said apparatus comprising a probe carriage associated with the transmission line and movable therealong, a pair of electric probes secured to the probe carriage, the wave guide transmission line having a longitudinal slot through which said probes extend, a servomotor, drive means mechanically linking the servomotor to the probe carriage whereby rotation of the servomotor moves the probe carriage along the slotted wave guide transmission line, a detector connected to each of the probes, and means responsive to the detected voltage at the respective probes for controlling the servomotor, said means producing a direction of rotation of the servomotor corresponding to the relative potential at said probes whereby the servomotor positions the carriage at a point where the potentials at the probes are equal.

12. Apparatus for automatically indicating the position of a voltage maximum or minimum of a voltage standing wave pattern along a wave guide transmission line, said apparatus comprising probe means associated with the line for movement therealong, a servomotor associated with said probe means for imparting movement to said probe means along the line, and servo control means responsive to variations in potential along the line detected by said probe means, the servo control means actuating the servomotor in response to said detected variations to maintain the probe means at any one of the significant points along the line of the class including points of voltage maximum and minimum of the standing wave pattern.

13. Apparatus for automatically measuring the impedance of a microwave load, said apparatus comprising a source of microwave energy, a microwave transmission line coupling the source to the load, the load establishing a standing wave pattern along the line, means coupled to the line and responsive to the reflected energy from the load, said means producing an output signal proportional to the magnitude of the reflected energy from the load, servo operated probe means associated with the line for movement therealong, said servo operated probe means being automatically positioned along the line in fixed relation to the standing wave pattern as detected by said probe means, a position-indicating potentiometer mechanically coupled to the probe means for producing a voltage proportional to the position of the probe means relative to the load, wavelength responsive means for producing a voltage proportional to the wavelength along the line, electrical computer means for determining the ratio of the output voltage of the position-indicating potentiometer to the voltage output of the wavelength responsive means, and impedance indicating means responsive simultaneously to the output of the computer means and the reflected energy responsive means, said impedance indicating means presenting the impedance of the load as a point on an impedance chart, the polar coordinates of the point being proportional respectively to the output of the reflected energy responsive means and computer means.

14. Apparatus for automatically measuring the impedance of a microwave load, said apparatus comprising a source of microwave energy, a microwave transmission line coupling the source to the load, the load establishing a standing wave pattern along the line, means coupled to the line and responsive to the reflected energy from the load, said means producing an output signal proportional to the magnitude of the reflected energy from the load, servo operated probe means associated with the line for movement therealong, said servo operated probe means being automatically positioned along the line in fixed relation to the standing wave pattern as detected by said probe means, means for indicating the instantaneous wavelength of the standing wave pattern along the line, computer means coupled respectively to said servo operated probe means and said wavelength indicating means, the computer means producing an output indication proportional to the ratio of the distance of the probe means from said pretermined point to the wavelength, and impedance indicating means responsive simultaneously to the output of the computer means and the reflected energy responsive means, said impedance indicating means presenting the impedance of the load as a point on an impedance chart, the polar coordinates of the point being proportional respectively to the output of the reflected energy responsive means and computer means.

15. Apparatus for automatically recording changes in impedance of a microwave load with changes in frequency, said apparatus comprising a variable frequency source of microwave energy, a hollow wave guide coupling the source to the load, a polar coordinate type recorder for plotting magnitude and phase angle of the reflection coefficient of the load on an impedance chart, a first servomotor associated with the recorder for controlling the radial coordinate of the recorder, a second servomotor associated with the recorder for controlling the angular coordinate of the recorder, a pair of directional couplers connected into said hollow wave guide between the source and load, the couplers respectively sampling energy from the incident and reflected energy waves in the hollow wave guide, detector means coupled to the directionally coupled output signals of each of the directional couplers for producing output signals having potentials corresponding respectively to the amplitudes of the incident and reflected waves, a potentiometer mechanically connected to said first servomotor, the potential of the output signal responsive to the incident wave being applied across said potentiometer, servo control means for operating said first servomotor in response to the difference in potential between said output signal responsive to the reflected wave and the output signal at the sliding contact of the potentiometer, whereby the radial coordinate of the recorder is controlled in response to the difference in magnitude between the reflected and incident waves in said wave guide, and means responsive to the difference in phase between the incident and reflected waves at the load for controlling said second servomotor.

16. Apparatus for indicating changes in the reflection coefficient of a microwave test load with changes in frequency, said apparatus comprising a variable frequency source of microwave energy, transmission means including a pair of directional couplers for coupling the source to the test load, the directional couplers being arranged to sample respectively the incident and reflected waves between the source and the load, a pair of detector means electrically coupled to the respective directional couplers for producing output signals having potentials corresponding respectively to amplitude of the incident and reflected waves, and means for indicating the difference in potential of the two detector means including a potentiometer connected across the output of the incident wave detecting means and servomotor means mechanically coupled to the sliding contact of said potentiometer, the servomotor means being electrically connected to the sliding contact of the potentiometer and the output of the reflected wave detecting means, the servomotor means actuating the sliding contact of the potentiometer in response to the difference in potential of the two potentials applied to the input of the servomotor means, whereby the position of the sliding contact indicates the difference amplitude between the incident and reflected waves.

References Cited in the file of this patent
UNITED STATES PATENTS

| Number | Name | Date |
|---|---|---|
| 2,284,476 | MacKay | May 26, 1942 |
| 2,605,323 | Samuel | July 29, 1952 |
| 2,624,780 | Byrne | Jan. 6, 1953 |